No. 731,573. PATENTED JUNE 23, 1903.
A. JOHNSON.
ROTARY STEAM COOKER.
APPLICATION FILED MAR. 6, 1902.
NO MODEL.
2 SHEETS—SHEET 1.

Witnesses,
J. L. Jenkins
William B. Thomas

Inventor
Adolph Johnson,
by Edwin Guthrie.
Attorney.

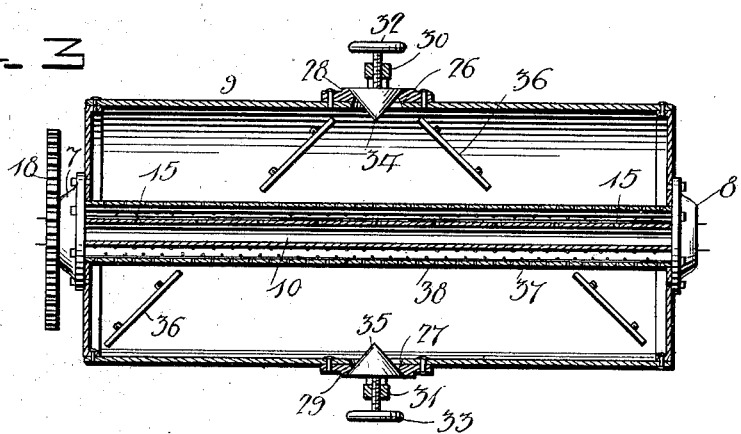
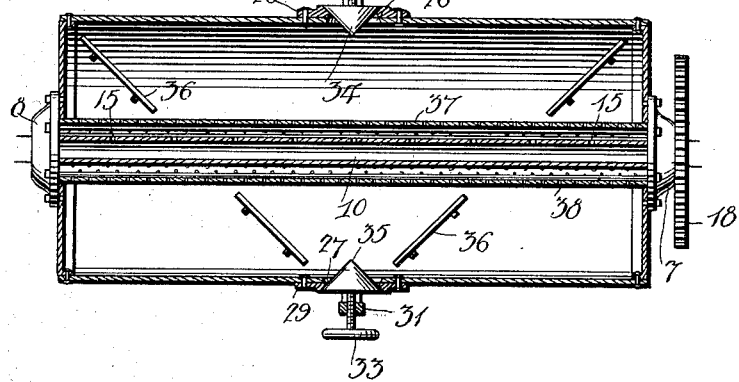

No. 731,573.

Patented June 23, 1903.

UNITED STATES PATENT OFFICE.

ADOLPH JOHNSON, OF BATTLECREEK, MICHIGAN.

ROTARY STEAM-COOKER.

SPECIFICATION forming part of Letters Patent No. 731,573, dated June 23, 1903.

Application filed March 6, 1902. Serial No. 96,924. (No model.)

*To all whom it may concern:*

Be it known that I, ADOLPH JOHNSON, a citizen of the United States, residing at Battlecreek, in the county of Calhoun and State of Michigan, have invented certain new and useful Improvements in Rotary Steam-Cookers; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to rotary steam-cookers; and its object is to produce apparatus for the effective cooking of grain by means of steam, comprising in itself devices for distributing the steam throughout the barrel or body of the cooker, and for preventing the entrance into the cooker of the water of condensation, and for permitting the ready emptying of the contents of the cooker, and for directing the revolving contents toward the mouths or hand-holes, and for clearing the barrel of moisture-laden atmosphere after the cooking operation has been completed, at the same time cooling the cooked grain.

Each constituent element of my invention is described in detail and its individual office, together with the mode of operation of the whole, fully explained hereinbelow.

I accomplish the objects stated by using the mechanism illustrated in the accompanying drawings, in which—

Figure 1:
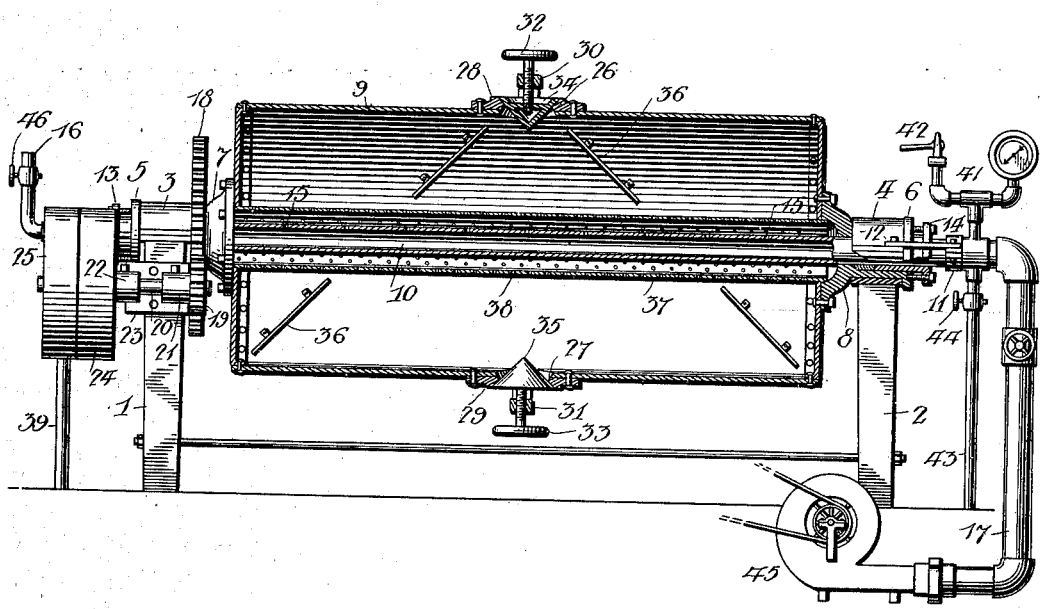
Figure 2:
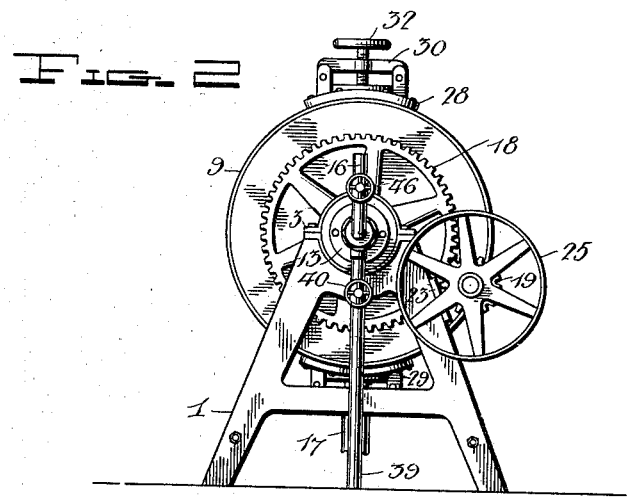

Figure 1 is a side view, partly in section, to aid the description; and Fig. 2 is an end view looking from the left of Fig. 1. Figs. 3 and 4 are sectional views representing the two opposite sides of the interior of the barrel or drum of my invention. These two last-numbered views are introduced particularly to show the vanes on opposite sides of the interior of the barrel and that they converge toward one of the hand-holes on one side of the barrel, while those on the opposite side converge toward the remaining hand-hole.

Like numbers refer to the same parts throughout.

Considering the drawings, numerals 1 and 2 mark the supporting end frames, and numbers 3 and 4 are the bearings, supported by the end frames in any desired manner. In these bearings are located the trunnions 5 and 6, formed integrally with the dished hub-plates 7 and 8, bolted centrally upon the ends of the drum or barrel 9 of the cooker.

Number 10 designates the steam-service pipe running through the cooker and held stationary by means of the strap-clamp 11, attached to the bar 12, the latter being secured to end frame 2. The pipe 10 passes centrally through the trunnions to the interior of the drum 9, and in order that the entrance and exit of the pipe may be reasonably steam-tight stuffing-boxes of any chosen form (referred to by numerals 13 and 14) are provided. The pipe 10 is pierced with a series of perforations 15, all of which, it will be observed, are on the upper side of the pipe. This arrangement of the perforations prevents any of the water of condensation from dripping into the cooker. Number 16 marks the entrance or live-steam pipe, and number 17 the exhaust-steam pipe. They are connected, respectively, at the left and right hand ends of the service-pipe 10.

To hub-plate 7, at the left-hand end of barrel 9, is suitably fixed the gear 18, and a pinion 19 engages and operates the gear. The pinion terminates a shaft 20, revoluble in bearings 21 and 22, supported by a bracket 23, secured to the end frame 1, as shown. At the outer end of the shaft a fixed pulley 24 and loose pulley 25 are located, and through this mechanism the barrel 9 is revolved.

About the middle of the barrel and diametrically opposite each other, as usually placed, are the hand-holes 26 and 27. The hand-hole frames are marked 28 and 29, the hand-hole bars are numbered 30 and 31, the screws are designated by numbers 32 and 33, and the hand-hole plates by numbers 34 and 35. It is my custom to fashion the plates in conical or equivalent form, as this shape acts to break up the masses of grain as the barrel revolves when emptying it.

In Figs. 1 and 3 the vanes 36 are shown on one side of the interior of the barrel 9 converging toward the hand-hole 26, and in Fig. 4 the vanes 36 are shown on the opposite side of the interior of the barrel converging toward the remaining hand-hole 27, which lies opposite hand-hole 26. Let it be assumed that the barrel is revolved from the position drawn in Fig. 1. With the hand-hole 26 uppermost and moving from the observer any grain massed within the barrel must continuously fall from the rising side, and as the vanes rise upon the near side the mass falls between them and is guided convergently toward the hand-holes; but suppose the barrel to be oppositely rotated, hand-hole 26 uppermost and coming toward the observer, under such conditions the vanes rise on the far side, as shown, and the grain falling against them is divergently directed. Any number of vanes may be used. By revolving the barrel alternately in opposite directions it will be understood that the contents will be directed toward and from the hand-holes, and by such reversals of revolution the mass can be thoroughly stirred and mixed. When it becomes necessary to empty the cooker, the revolution given the barrel is such as to move the grain to the hand-holes, and the discharging operation can be thus carried on without scooping or shoveling the grain by hand.

Number 37 marks a cylindrical screen or perforated pipe encircling the service-pipe 10 throughout its length within the cooker and revolving with the barrel 9. The office of the screen, of which the perforations 38 are relatively of small size, is to distribute the steam throughout the length of the barrel, causing it to be delivered all around the service-pipe into the cooker in every direction and to every part of its length and to keep the grain from the steam-pipe 10.

In Figs. 1 and 2 will be seen the pipe 39, including a valve 40, by means of which hot water can be supplied to the interior when it is desired to cook grain by actual contact with hot water. After cooking the hot water may be drained out through either hand-hole. It is also my practice to use pipe 39 to conduct water into the apparatus for cleaning purposes. Under suitable pressure water will spray through the perforations of pipe 37 in all directions and thoroughly wash the interior of drum 9. It is also an office of the screen 37 to cause this entering water to be sprayed in every direction within the barrel to thoroughly wash it interiorly as required.

It is believed to be clear that grain may be introduced or withdrawn from either hand-hole, and by opening either very slightly any excess of water may be drawn off.

I do not limit myself to the precise form or arrangement of the various parts illustrated, but may modify their shapes within the purview of my invention.

At the right of Fig. 1 is a T 41, and from one side there extends a continuation of the exhaust-pipe 17, and this continuation may include a safety-valve 42. From the bottom side of the T a pipe 43, having the valve 44, leads downwardly and constitutes a condensed-water-drain pipe. A fan 45 or exhaust-pump is situated at any point convenient to the cooker and connected with the exhaust-pipe. The apparatus thus becomes adapted for the following operation: On the left hand the live-steam pipe 16 is furnished with a valve 46. If the steam be shut off at valve 46 and the barrel stopped with hand-hole — say hand-hole 26 — uppermost, this hand-hole may be opened to any degree without the contents falling forth. If, further, the exhaust-pipe 17 be opened by valve 42, external air may be drawn by fan 45 through the cooker, entering by the hand-hole and passing to every part of the barrel in its efforts to escape through the screen-perforations 38, and all the moisture and vapor in the barrel will be thus sucked out by the fan, the entering air at the same time cooling and drying the grain and greatly increasing the output of the apparatus. It will be readily understood that the fan may be detached and the exhaust-pipe employed simply as an exhaust.

I am aware that digesters and cookers have been constructed having rotary barrels and internal steam-service, and I do not claim those features broadly.

What I claim, and desire to secure by Letters Patent of the United States, is—

1. In a rotary steam-cooker, the combination of the centrally-disposed stationary steam-service pipe having a series of perforations, a barrel revoluble about the said steam-pipe, the said barrel being provided with hand-holes and hand-hole plates, a perforated cylinder surrounding the said stationary steam-pipe within the barrel, and means for exhausting air from the said barrel, substantially as described.

2. In a rotary steam-cooker, the combination of the central stationary steam-service pipe having a series of perforations along its upper side, a barrel revoluble about the said steam-pipe, the said barrel being provided with hand-holes oppositely disposed, hand-hole plates and means for securing them in position, vanes attached to the interior of the said barrel on opposite sides convergently toward the said hand-holes, a perforated cylinder surrounding the steam-service pipe within the barrel, and means for exhausting air from the barrel, substantially as described.

3. In a rotary steam-cooker, the combination of a revoluble barrel having hand-holes provided with removable plates, bearings supporting the said barrel, mechanism constructed and arranged to revolve the barrel, pipes adapted to convey steam to and from the said barrel, and vanes attached to the interior of the said barrel on opposite sides convergently toward the said hand-holes, substantially as described.

4. In a rotary steam-cooker, the combination of a revoluble barrel having diametrically opposite hand-holes and hand-hole plates, vanes attached to the interior of the said barrel on opposite sides convergently toward the said hand-holes, longitudinally-disposed steam-serving means arranged within the said barrel, piping connections, and air-exhausting devices whereby the moist air and steam may be withdrawn from the interior of the barrel, the said piping connections being constructed and arranged to permit the revolution of the said barrel.

In testimony whereof I affix my signature in presence of two witnesses.

ADOLPH JOHNSON.

Witnesses:
GEO. W. TAYLOR,
H. J. JOHNSON.